US012524522B2

(12) United States Patent
Pallapolu et al.

(10) Patent No.: US 12,524,522 B2
(45) Date of Patent: Jan. 13, 2026

(54) SYSTEM AND METHOD FOR GENERATING SANDBOX ENVIRONMENTS IN A COMPUTING NETWORK

(71) Applicant: Bank of America Corporation, Charlotte, NC (US)

(72) Inventors: Kalyan Chakravarthy Pallapolu, Hyderabad (IN); Mohan Sreenivas Gali, Tirupati (IN)

(73) Assignee: Bank of America Corporation, Charlotte, NC (US)

( * ) Notice: Subject to any disclaimer, the term of this patent is extended or adjusted under 35 U.S.C. 154(b) by 101 days.

(21) Appl. No.: 18/631,006

(22) Filed: Apr. 9, 2024

(65) Prior Publication Data
US 2025/0315515 A1    Oct. 9, 2025

(51) Int. Cl.
| | | |
|---|---|---|
| *G06F 21/53* | (2013.01) | |
| *G06F 8/41* | (2018.01) | |
| *G06F 21/60* | (2013.01) | |
| *G06F 21/62* | (2013.01) | |

(52) U.S. Cl.
CPC ............ *G06F 21/53* (2013.01); *G06F 8/433* (2013.01); *G06F 21/602* (2013.01); *G06F 21/604* (2013.01); *G06F 21/6245* (2013.01)

(58) Field of Classification Search
CPC .... G06F 21/53; G06F 21/6245; G06F 21/604; G06F 21/31; G06F 21/602; G06F 21/57; G06F 8/433
USPC .......................................................... 726/26
See application file for complete search history.

(56) References Cited

U.S. PATENT DOCUMENTS

| | | | |
|---|---|---|---|
| 8,924,543 | B2 | 12/2014 | Raleigh et al. |
| 9,557,889 | B2 | 1/2017 | Raleigh et al. |
| 9,810,729 | B2 | 11/2017 | Frediani |
| 9,952,276 | B2 | 4/2018 | Frediani et al. |
| 10,161,993 | B2 | 12/2018 | Frediani et al. |
| 10,162,007 | B2 | 12/2018 | Chan et al. |
| 10,288,681 | B2 | 5/2019 | Champoux et al. |
| 10,462,627 | B2 | 10/2019 | Raleigh et al. |
| 10,869,199 | B2 | 12/2020 | Raleigh et al. |
| 10,976,361 | B2 | 4/2021 | Malisic et al. |
| 11,122,424 | B1 * | 9/2021 | Branscomb ......... H04W 12/033 |

(Continued)

FOREIGN PATENT DOCUMENTS

| | | |
|---|---|---|
| CN | 115994354 A | 4/2023 |
| RU | 2750554 C2 | 6/2021 |

OTHER PUBLICATIONS

NPL Search Terms (Year: 2025).*

*Primary Examiner* — Syed A Zaidi (57) ABSTRACT

In response to receiving a request from a user to generate a sandbox, one or more smart contracts is selected based on complexity metrics associated with one or more data modules requested for copying from a production environment to the requested sandbox. Based on the selected one or more smart contracts, one or more approvers are determined that are authorized to approve access of the user to the data relating to the one or more data modules. An approval workflow is generated and transmitted to the determined one or more approvers. Upon receiving an indication of approval from the one or more approvers, the sandbox is generated by copying the one or more data modules from the production environment to the requested sandbox.

20 Claims, 2 Drawing Sheets

(56) References Cited

U.S. PATENT DOCUMENTS

| | | | |
|---|---|---|---|
| 11,218,854 B2 | 1/2022 | Raleigh et al. | |
| 11,430,536 B2 | 8/2022 | Malisic et al. | |
| 11,494,837 B2 | 11/2022 | Raleigh et al. | |
| 11,570,309 B2 | 1/2023 | Raleigh et al. | |
| 11,860,229 B2 | 1/2024 | Su | |
| 2014/0040975 A1 | 2/2014 | Raleigh et al. | |
| 2014/0248852 A1 | 9/2014 | Raleigh et al. | |
| 2017/0353309 A1* | 12/2017 | Gray | G06F 21/51 |
| 2018/0191714 A1* | 7/2018 | Jentzsch | G06F 21/445 |
| 2019/0303623 A1* | 10/2019 | Reddy | G06F 8/71 |
| 2020/0028691 A1* | 1/2020 | Rao | G06F 8/658 |
| 2021/0117298 A1 | 4/2021 | Su et al. | |
| 2024/0137208 A1* | 4/2024 | Zhu | G06Q 20/40 |
| 2024/0214229 A1* | 6/2024 | Han | G06F 16/25 |
| 2025/0062924 A1* | 2/2025 | Zhu | H04L 9/3239 |
| 2025/0238254 A1* | 7/2025 | Schmid | G06F 21/55 |
| 2025/0278906 A1* | 9/2025 | Witchey | G06T 19/006 |

* cited by examiner

SYSTEM AND METHOD FOR GENERATING SANDBOX ENVIRONMENTS IN A COMPUTING NETWORK

TECHNICAL FIELD

The present disclosure relates generally to network communication, and more specifically to a system and method for generating sandbox environments in a computing network.

BACKGROUND

A sandbox is a type of environment that isolates untested code changes and software deployments from the main production environment. It is a way to safely test new features and code changes before they are released into the main production environment. Generally, when a user (e.g., a software developer, tester etc.) requests generation of a sandbox, the entire data associated with the production environment is copied to the sandbox without any consideration for whether the requesting user is authorized to view/consume portions of the data that is copied from the production environment. For example, the production environment may store data associated with several data modules wherein each data module may include one or more data files that store data associated with a particular line of business of an organization. Users may not be authorized to access/view data associated with all data modules. Further, some of the data modules may store data that is considered sensitive data that is accessible to certain authorized users only. Copying the entire dataset (including all data modules and sensitive data) associated with the production environment into a sandbox environment unnecessarily exposes data to irrelevant and unauthorized users. This compromises data security and may lead to breaches of data policies and regulatory requirements.

SUMMARY

The system and method implemented by the system as disclosed in the present disclosure provide technical solutions to the technical problems discussed above by generating secure sandboxes accessible only to authorized users.

For example, the disclosed system and methods provide the practical application of an intelligent approval process for generation of a requested sandbox including approving access of users to data in a sandbox and avoiding unauthorized exposure and access of data in a sandbox. As described in embodiments of the present disclosure a sandbox manager may be configured to implement an approval process for generating sandboxes and authorizing users for access to data within the sandboxes. Sandbox manager may receive a request from a user to generate a sandbox associated with a production environment. The request may include a request to copy one or more data modules from the production environment to the requested sandbox environment. The discussed system and methods leverage smart contracts technology associated with blockchain networks to implement an approval process for generating sandboxes and authorizing user access to data within the sandboxes. The sandbox manager may have access to a plurality of smart contracts stored in the blockchain network. Each smart contract may include one or more rules relating to selection of one or more approvers that are authorized to approve access of the requesting user to data relating to the one or more data modules requested to be copied from the production environment to the requested sandbox. Sandbox manager may be configured to determine a complexity metric for each data module requested for copying from the production environment to the sandbox. The sandbox manager selects one or more smart contracts based on the complexity metrics associated with the data modules that were requested to be copied from the production environment to the requested sandbox. Each selected smart contract may identify one or more approvers associated with each of multiple data modules of the production environment that were selected for copying to the requested sandbox. For each selected data module, the sandbox manager generates an approval workflow, which may essentially be a document and/or data file that includes all information needed by an approver to review, consider and approve/disapprove a request from a user for access to the data module. Thee sandbox manager forwards the approval workflow generated for the data module to the identified one or more approvers. Upon receiving an indication of approval from each approver that was requested to approve access to the user for the selected data modules, the sandbox manager generates the requested sandbox.

By implementing the approval workflow for approving users' access to data requested to be copied from the production environment to a requested sandbox, the disclosed system and method improve data security in a computing network by avoiding unauthorized access to data. Further, by proactively requesting and receiving approval associated with data copied to the sandbox, the disclosed system and method save computing resources (e.g., processing and/or memory resources) that would otherwise be used to individually check access of a user to each data module or piece of data included in the sandbox after unauthorized access of the data has occurred. By saving computing resources, the disclosed system and method improve operation of computing nodes used to implement generation and management of sandboxes.

The disclosed system and method provide an additional practical application of improving data security in a computing network by using a blockchain network to implement the approval process associated with generating sandboxes. For example, by using smart contract technology to implement the approval workflows related with requested sandboxes, the disclosed system and method immutably record the data interactions associated with generation of sandboxes in the blockchain network. This avoids tampering of the entire process associated with the approval and generation of sandboxes, thus improving data security.

Thus, the disclosed system and method generally improves blockchain technology and the technology associated with sandboxes.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
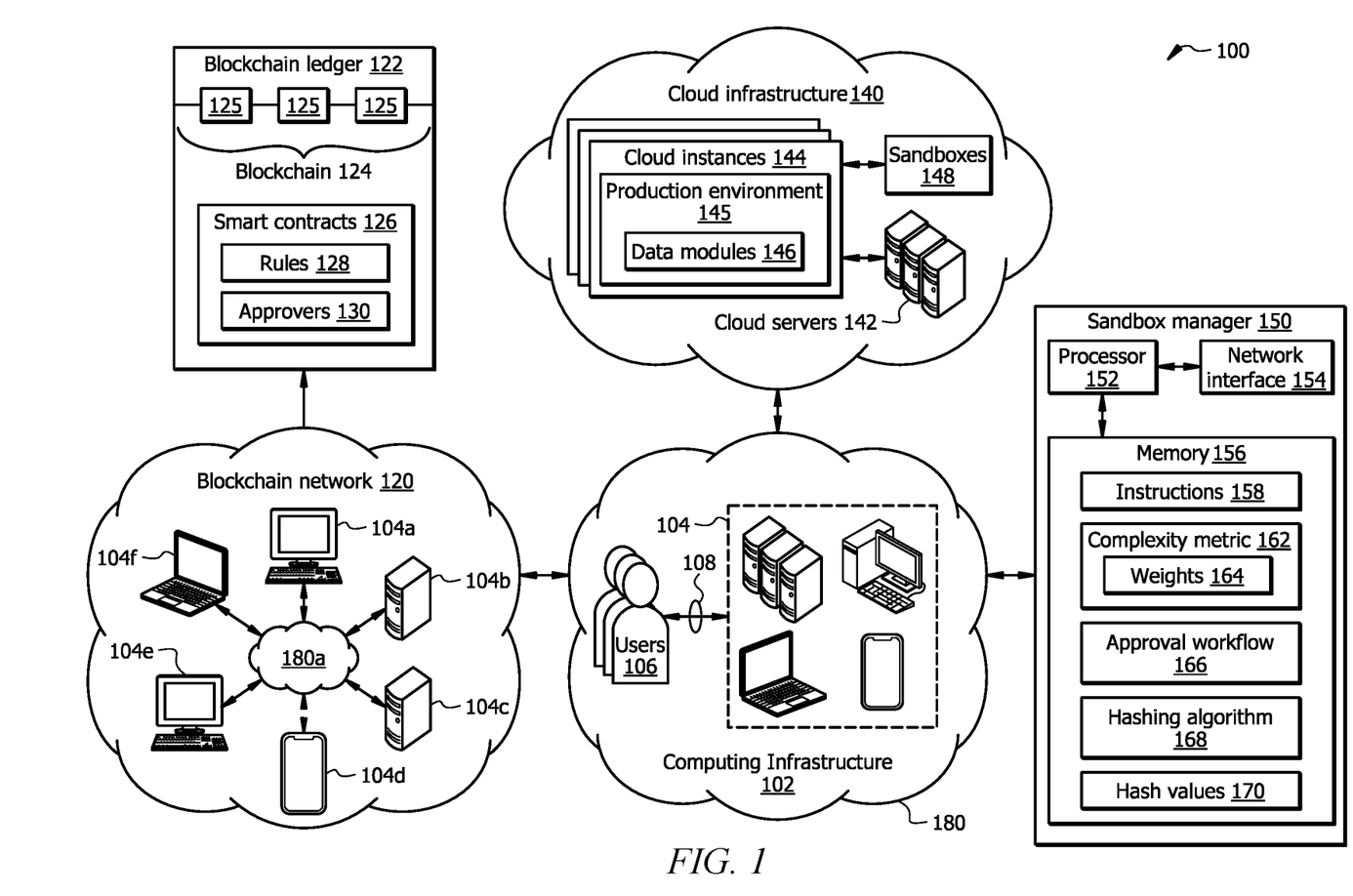
FIG. 1 is a schematic diagram of a system, in accordance with certain aspects of the present disclosure.

FIG. 1 is a schematic diagram of a system 100, in accordance with certain aspects of the present disclosure. As shown, system 100 includes a computing infrastructure 102 and a cloud infrastructure 140 connected to a network 180. Computing infrastructure 102 may include a plurality of hardware and software components. The hardware components may include, but are not limited to, computing nodes 104 such as desktop computers, smartphones, tablet computers, laptop computers, servers and data centers, mainframe computers, virtual reality (VR) headsets, augmented reality (AR) glasses and other hardware devices such as printers, routers, hubs, switches, and memory all connected to the network 180. Software components may include software applications that are run by one or more of the computing nodes 104 including, but not limited to, operating systems, user interface applications, third party software, database management software, service management software, mainframe software, metaverse software, AI tools and other customized software programs (e.g., sandbox manager 150) implementing particular functionalities. For example, software code relating to one or more software applications may be stored in a memory device and one or more processors (e.g., belonging to one or more computing nodes 104) may execute the software code to implement respective functionalities. An example software application run by one or more computing nodes 104 of the computing infrastructure 102 may include the sandbox manager 150. In one embodiment, at least a portion of the computing infrastructure 102 may be representative of an Information Technology (IT) infrastructure of an organization.

One or more of the computing nodes 104 may be operated by a user 106. For example, a computing node 104 may provide a user interface using which a user 106 may operate the computing node 104 to perform data interactions within the computing infrastructure 102.

One or more computing nodes 104 of the computing infrastructure 102 may be representative of a computing system which hosts software applications that may be installed and run locally or may be used to access software applications running on a server (not shown). The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the computing nodes 104 may be representative of a server running one or more software applications to implement respective functionality (e.g., sandbox manager 150) as described below. In certain embodiments, one or more of the computing nodes 104 may run a thin client software application where the processing is directed by the thin client but largely performed by a central entity such as a server (not shown).

Network 180, in general, may be a wide area network (WAN), a personal area network (PAN), a cellular network, or any other technology that allows devices to communicate electronically with other devices. In one or more embodiments, network 180 may be the Internet.

At least a portion of the computing infrastructure 102 may include a blockchain network 120. For example, a portion of the computing nodes 104 may form the blockchain network 120. As shown in FIG. 1, example blockchain network 120 includes computing nodes 104a, 104b, 104c, 104d, 104e and 104f connected to each other via a portion of the network 180 (shown as 180a). The blockchain network 120 implements distributed computing which generally refers to a method of making multiple computers (e.g., computing nodes 104a-104f) work together to solve a common problem. This makes a computer network (e.g., blockchain network 120) appear as a powerful single computer that provides large-scale resources to deal with complex challenges. For example, distributed computing can encrypt large volumes of data, solve complex physics and chemical equations with many variables, and render high-quality, three-dimensional video animation. Distributed computing often uses specialized software applications that are configured to run on several computing nodes 104 instead of on just one computer, such that different computers perform different tasks and communicate to develop the final solution. High-performing distributed computing is often used in engineering research, financial services, energy sector and the like to run complex processes.

Blockchain network 120 may implement a blockchain 124 across a plurality of the computing nodes 104 (e.g., computing nodes 104a-104f). A blockchain (e.g., blockchain 124) generally is an open, decentralized and distributed digital ledger (e.g., blockchain ledger 122) consisting of records called blocks that are used to record data interactions across many computing nodes (e.g., computing nodes 104). Each computing node 104 of a blockchain network (e.g., blockchain network 120) may maintain a copy of the blockchain ledger (e.g., blockchain ledger 122). Logically, a blockchain is a chain of blocks which contains specific information. As shown in FIG. 1, blockchain 124 includes a chain of blocks 125. Once recorded, the data in any given block 125 cannot be altered retroactively without alteration of all subsequent blocks 125, which requires consensus of the network majority. Each computing node 104 within the blockchain network 120 maintains, approves, and updates new entries. The system is controlled not only by separate individuals, but by everyone within the blockchain network 120. Each member ensures that all records and procedures are in order, which results in data validity and security. Thus, the distributed ledger 122 can record data interactions between two parties (e.g., users 106) efficiently and in a verifiable and permanent way. By design, a blockchain 124 is resistant to modification of the data.

Any new interaction or activity within the blockchain network may trigger the building of a new block of the blockchain. An interaction may include a computing node 104 of the blockchain network transmitting or receiving data from another computing node 104 of the blockchain network or from a computing node that is not part of the blockchain network. Before a new block is added to the blockchain, it needs to be verified by a majority of the computing nodes in the blockchain network.

Each block 125 of the blockchain includes a hash of the block, a hash of the previous block, data that records one or more data interactions or activities associated with the block, and a timestamp of the one or more interactions or activities recorded by the block. The data stored in each block 125 depends on the type of blockchain 124. For example, the data included in a block 125 may include information relating to the data interaction recorded by the block 125 including transmitting/receiving data, details of the data files, a copy of data received or generated as part of the interaction, identities of the sending and receiving nodes involved in the interaction etc. A hash of a block is like a fingerprint that uniquely identifies the block (and the interaction or activity recorded by the block) within the blockchain. Each hash of a block is generated based on a cryptographic hash algorithm.

One or more data interactions may be performed in the blockchain network 120 in accordance with smart contracts 126. A smart contract 126 is a software application or a piece of software code that implements conditions/rules associated with one or more data interactions performed by users 106 of the blockchain network 120. A data interaction is generally processed according to the conditions in the smart contract 126 are met. For example, as described in embodiments of the present disclosure, a smart contract 126 may include rules 128 that implement an approval workflow 166 associated with a requested sandbox 148. Smart contracts 126 are generally stored in the blockchain 124 (e.g., in the blockchain ledger 122) and can be freely accessed and reviewed by all users 106 of the blockchain network 120. Once created and stored in the blockchain 124, a smart contract 126 generally cannot be modified. Data interactions performed in accordance with a smart contract 126 are generally processed by the blockchain (e.g., one or more computing nodes 104) without a third party. Smart contracts 126 make it possible to securely automate and decentralize any data interaction conducted in the blockchain network 120 no matter how complex. Thus, smart contracts 126 allow users 106 of the blockchain network 120 to securely engage in complex data interactions without a trusted third party needing to administer these data interactions.

The cloud infrastructure 140 may be communicatively coupled to one or more other devices in system 100 (e.g., one or more computing nodes 104 of the computing infrastructure), for example, via network 180. The cloud infrastructure 140 may include a set of one or more hardware resources and software resources. In this context a hardware resource may include but is not limited to, a processor, a memory device, a server, a database, or any other hardware device. For example, as shown in FIG. 1, the cloud infrastructure may include a plurality of cloud servers 142. A software resource may include, but is not limited to, a software program or application such as an operating system, user interface or other customized software that can implement one or more functionalities. The cloud infrastructure 140 may provide pre-configured cloud instances 144, wherein each cloud instance 144 of the cloud infrastructure 140 includes a unique set of hardware and/or software resources associated with the cloud infrastructure 140. In cloud computing, a cloud instance 144 generally refers to a virtual machine that uses one or more hardware and/or software resources of a cloud infrastructure to run a workload. The term "workload" generally refers to an application or service deployed using a computing machine (e.g., virtual machine) that consumes resources such as computing power and memory. In addition to the pre-configured cloud instances 144, the cloud infrastructure 140 may allow customized cloud instances 144 to be created to cater to customized needs. In one embodiment, the cloud infrastructure 140 may be provided by a cloud vendor.

In one or more embodiments, one or more cloud instances 144 associated with the cloud infrastructure 140 may implement a production environment 145. Production environment 145 represents a computing environment of an organization (e.g., an organization that owns and/or operates the computing infrastructure 102) where the latest versions of software, products or updates are pushed live to the intended users. The production environment 145 can be thought of as a real-time computing system where computer programs are run, and hardware setups are installed and relied on for an organization's daily operations. The production environment 145 may include one or more hardware devices and one or more software applications. Hardware devices may include, but are not limited to, one or more processors, one or more memory devices, servers, desktop computer, mobile computing devices, printed circuit boards (e.g., display cards, sound cards, interface cards etc.), electronic components (e.g., transistors, diodes, capacitors, resistors etc.) and machines. Software applications may include software programs including, but not limited to, operating systems, user interface applications, third party software, database management software and other customized software programs implementing particular functionalities in the production environment 145.

In certain embodiments, the cloud infrastructure 140 may allow users 106 to generate sandboxes 148. A sandbox 148 in cloud computing is a type of environment that isolates untested code changes and software deployments from the main production environment 145. It is a way to safely test new features and code changes before they are released into the main production environment 145. A sandbox 148 may be implemented using hardware resources provide by the cloud infrastructure 140. In one embodiment, one or more cloud instances 144 may be used to implement a sandbox environment. Generally, a sandbox 148 is a copy of at least a portion of the production environment 145. This allows a user (e.g., a software developer, tester etc.) to test out a new piece of software code or other software updates in an environment that is similar to the production environment 145 without making any changes to the actual production environment 145.

In present systems, when a user 106 (e.g., a software developer, tester etc.) requests generation of a sandbox 148, the entire data associated with the production environment 145 is copied to the sandbox 148 without any consideration for whether the requesting user 106 is authorized to view/consume portions of the data that is copied from the production environment 145. For example, the production environment 145 may store data associated with several data modules 146 wherein each data module 146 may include one or more data files that store data associated with a particular line of business of an organization. Users 106 may not be authorized to access/view data associated with all data modules 146. For example, different users 106 may be authorized to access/view one or more of the data modules 146 but not all data modules 146. Further, some of the data modules 146 may store data that is considered sensitive data that is accessible to certain authorized users 106 only. Copying the entire dataset (including all data modules 146 and sensitive data) associated with the production environment 145 into a sandbox environment 148 unnecessarily exposes data to irrelevant and unauthorized users 106. This compromises data security and may lead to breaches of data policies and regulatory requirements.

Embodiments of the present disclosure describe an intelligent approval process for generation of a requested sandbox 148 including approving access of users to data in a sandbox 148 and avoiding unauthorized exposure and access of data in a sandbox 148.

At least a portion of the computing infrastructure 102 (e.g., one or more computing nodes 104) may implement a sandbox manager 150 which may be configured to implement an approval process for generating sandboxes 148 and authorizing users for access to data within the sandboxes 148. The sandbox manager 150 comprises a processor 152, a memory 156, and a network interface 154. The sandbox manager 150 may be configured as shown in FIG. 1 or in any other suitable configuration.

The processor 152 comprises one or more processors operably coupled to the memory 156. The processor 152 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 152 may be a programmable logic device, a microcontroller, a microprocessor, or any suitable combination of the preceding. The processor 152 is communicatively coupled to and in signal communication with the memory 156. The one or more processors are configured to process data and may be implemented in hardware or software. For example, the processor 152 may be 8-bit, 16-bit, 32-bit, 64-bit or of any other suitable architecture. The processor 152 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions, such as software instructions. For example, the one or more processors are configured to execute instructions 158 to implement the sandbox manager 150. In this way, processor 152 may be a special-purpose computer designed to implement the functions disclosed herein. In one or more embodiments, the sandbox manager 150 is implemented using logic units, FPGAs, ASICs, DSPs, or any other suitable hardware. The sandbox manager 150 is configured to operate as described with reference to FIG. 2. For example, the processor 152 may be configured to perform at least a portion of the method 200 as described in FIG. 2.

The memory 156 comprises a non-transitory computer-readable medium such as one or more disks, tape drives, or solid-state drives, and may be used as an over-flow data storage device, to store programs when such programs are selected for execution, and to store instructions and data that are read during program execution. The memory 156 may be volatile or non-volatile and may comprise a read-only memory (ROM), random-access memory (RAM), ternary content-addressable memory (TCAM), dynamic random-access memory (DRAM), and static random-access memory (SRAM).

The memory 156 is operable to store the complexity metrics 162 (including weights 164) associated with the requested sandbox 148 or data modules 146 included/to be included in the sandbox 148, copies of one or more smart contracts 126 from the blockchain network 120, approval workflows 166, hashing algorithms 168 associated with data modules 146, hash values 170 associated with approval workflows 166, instructions 158, and any other data needed to performed operations of the sandbox manager 150 as described in embodiments of the present disclosure. The instructions 158 may include any suitable set of instructions, logic, rules, or code operable to execute the sandbox manager 150.

The network interface 154 is configured to enable wired and/or wireless communications. The network interface 154 is configured to communicate data between the sandbox manager 150 and other devices, systems, or domains (e.g., computing nodes 104, cloud infrastructure 140 etc.). For example, the network interface 154 may comprise a Wi-Fi interface, a LAN interface, a WAN interface, a modem, a switch, or a router. The processor 152 is configured to send and receive data using the network interface 154. The network interface 154 may be configured to use any suitable type of communication protocol as would be appreciated by one of ordinary skill in the art.

It may be noted that each of the computing nodes 104 and cloud servers 142 may be implemented like the sandbox manager 150 shown in FIG. 1. For example, each of the computing nodes 104 and/or the cloud servers 142 may have a respective processor and a memory that stores data and instructions to perform a respective functionality of the computing node 104 and/or cloud server 142 respectively.

The sandbox manager 150 may be configured to receive a request 108 from a user 106 to generate a sandbox 148 associated with the production environment 145 that is deployed in the cloud infrastructure 140. In one embodiment, the request 108 requests generation of the requested sandbox 148 in the cloud infrastructure 140, for example, using computing resources (e.g., cloud instances 144) provided by the cloud infrastructure 140. The request 108 may include a request for a full copy of the production environment 145 which includes copying the entire data associated with all data modules 146 of the production environment 145 into the requested sandbox 148. Alternatively, the request 108 may include a request for a partial copy of the production environment 145 which includes copying a portion of the production environment 145 (e.g., data associated with one or more data modules 146 but not all data modules 146) to the requested sandbox 148. For example, the user 106 requesting generation of the requested sandbox 148 may have limited resources (e.g., processing and/or memory resources) assigned in the cloud infrastructure 140 for generation of a sandbox 148. Thus, in some cases the user 106 may not have sufficient resources (e.g., processing and/or memory resources) assigned in the cloud infrastructure 140 for a full copy of the production environment 145. In such cases, depending on the amount of resources (e.g., processing and/or memory resources) available to the user 106, the user 106 may request a partial copy of the production environment 145 in which only a portion of data (e.g., data relating to one or more data modules 146) from the production environment 145 is copied to the requested sandbox 148. In this context, the request 108 received from the user 106 may include identities of one or more data modules 146 being requested to be copied from the production environment 145 to the sandbox 148.

Sandbox manager 150 may be configured to leverage smart contracts technology associated with blockchain networks (e.g., blockchain network 120) to implement an approval process for generating sandboxes 148 and authorizing users (e.g., users 106) access to data within the sandboxes 148. Sandbox manager 150 may have access to a plurality of smart contracts 126 stored in the blockchain network 120 (e.g., stored in the blockchain ledger 122). Each smart contract 126 may include one or more rules 128 relating to selection of one or more approvers 130 that are authorized to approve access of the requesting user 106 to data relating to the one or more data modules 146 requested to be copied from the production environment 145 to the requested sandbox 148. A smart contract 126 may be configured to implement an approval workflow 166 based on a complexity metric 162 associated with a requested data module 146. For example, the one or more rules 128 associated with a smart contract 126 are configured to assign an approver 130 for review and approval of a requested data module 146 based on a complexity metric 162 associated with the requested data module 146. As described below, a complexity metric 162 associated with a data module 146 may be represented by one or more numerical weights 164 generated for the data module 146, wherein each numerical weight 164 is assigned based on a particular characteristic of the data module 146. In one embodiment, a particular smart contract 126 may be associated with a threshold value of a numerical weight 164 that is based on a particular characteristic of data modules 146, wherein the particular smart contract 126 may be selected to implement an approval workflow 166 for a data module 146 when the numerical weight 164 assigned to the data module 146 satisfies the threshold numerical weight associated with the smart contract 126.

Each smart contract 126 may identify of one or more approvers 130 that are authorized to review and approve access to a particular data module 146. In one embodiment, an approver 130 is a person that is authorized to review and approve access to a particular data module 146.

Sandbox manager 150 may be configured to determine a complexity metric 162 for a data module 146 requested (e.g., via request 108) for copying to the sandbox 148. In one embodiment, the sandbox manager 150 may be configured to employ a generative artificial Intelligence (AI) algorithm to generate numerical weights 164 based on different characteristics relating to a data module 146, wherein each numerical weight 164 generated for a data module 146 represents at least a portion of the complexity metric 162 of the data module 146. For example, the sandbox manager 150 (e.g., using the AI module) determines whether a data module 146 selected for copying to the requested sandbox 148 has data dependencies to other data modules 146 of the production environment 145. The sandbox manager 150 assigns a first numerical weight 164 to the data module 146 based on an amount (e.g., number) of dependencies to other data modules 146. For example, a first data module 146 that receives data from five other data modules 146 is assigned a higher first numerical weight 164 as compared to a second data module 146 that receives data from two data modules. The first numerical weight 164 assigned to the data module 146 represents a complexity metric 162 of the data module relating to inter-module dependencies. In this context, a particular smart contract 126 may be configured to handle (e.g., implement) an approval workflow 166 associated with data modules 146 that are dependent on other data modules 146. For example, the sandbox manager 150 may be configured to select the particular smart contract 126 when the first numerical weight 164 (representing an amount of inter-module dependencies) assigned to the data module 146 equals or exceeds a first threshold.

In an additional or alternative embodiment, the sandbox manager 150 (e.g., using the AI module) determines whether a data module 146 selected for copying to the requested sandbox 148 includes data that is designated as sensitive data that is to be accessible by authorized users only. The sandbox manager 150 assigns a second numerical weight 164 to the data module 146 based on an amount of sensitive data included in the data module 146. Sensitive data may include one or more of sensitive data comprises one or more of Non-Public Information (NPI), Personal Identification Information (PII), Production Information, or any other data that is designated as sensitive data. For example, a first data module 146 that includes a higher amount of sensitive data is assigned a higher second numerical weight as compared to the second data module 146 that has a lower amount of sensitive data. The second numerical weight 164 assigned to the data module 146 represents a complexity metric 162 of the data module indicating sensitive data. In this context, a particular smart contract 126 may be configured to handle (e.g., implement) an approval workflow 166 associated with data modules 146 that include sensitive data. For example, the sandbox manager 150 may be configured to select the particular smart contract 126 when the second numerical weight 164 (representing an amount of sensitive data) assigned to the data module 146 equals or exceeds a second threshold.

In an additional or alternative embodiment, the sandbox manager 150 (e.g., using the AI module) determines a degree of impact associated with updating a data module 146 (e.g., updating software code associated with the data module 146) selected for copying to the requested sandbox 148. For example, the sandbox manager 150 may determine how many data files associated with the selected data module 146 and/or other data modules 146 are impacted by updating the selecting data module 146. The sandbox manager 150 assigns a third numerical weight 164 to the data module 146 based on an amount of data files (e.g., a number of data files) impacted when the selected data module 146 is updated. For example, a first data module 146 that impacts a higher amount of data files is assigned a higher third numerical weight as compared to the second data module 146 that impacts a lower amount of data files. The third numerical weight 164 assigned to the data module 146 represents a complexity metric 162 of the data module indicating an impact of updating the data module 146. In this context, a particular smart contract 126 may be configured to handle (e.g., implement) an approval workflow 166 associated with data modules 146 when updating the data modules 146 causes a threshold impact to data files. For example, the sandbox manager 150 may be configured to select the particular smart contract 126 when the third numerical weight 164 (representing an amount of impact to data files) assigned to the data module 146 equals or exceeds a second threshold.

In certain embodiments, a particular smart contract may identify multiple approvers that can approve access to a same data module 146. In this case, the smart contract 126 may include rules 128 that select a particular approver 130 from the multiple approvers 130 based on a numerical weight 164 assigned to the data module 146. As described above, a numerical weight 164 may represent the amount of sensitive data contained in the data module 146, wherein a higher value of the numerical weight 164 represents a higher amount of sensitive data. The smart contract 126 may be configured to select a lower-level approver (e.g., a lower-level manager) for lower values of the numerical weight 164, and select a higher-level approver (e.g., an architect) for higher values of the numerical weight 164.

As described above, to implement an approval process associated with a requested sandbox 148, the sandbox manager 150 may be configured to select a smart contract 126 (from among a plurality of smart contracts 126) based on a complexity metric 162 (e.g., based on numerical weights 164 representing the complexity metric 162) associated with a data module 146 that was requested to be copied from the production environment 145 to the requested sandbox 148. For example, once one or more numerical weights 164 have been assigned to each data module 146 selected for inclusion in the requested sandbox 148, the sandbox manager 150 selects one or more smart contracts 126 based on the respective numerical weights 164 assigned to the data modules 146. For example, a smart contract 126 may be selected for each requested data module 146 as described above based on one or more numerical weights 164 assigned to the data module 146. In one embodiment, multiple smart contracts 126 may be selected for a single selected data module 146, wherein each smart contract 126 is selected based on a different type of numerical weight 164 assigned to the data module. For example, when a selected data module 146 includes inter-dependent modules and includes sensitive data, a first smart contract 126 may be selected that is configured to handle (e.g., implement) an approval workflow 166 associated with data modules 146 that are dependent on other data modules 146, and a second smart contract 126 may be selected that is configured to handle (e.g., implement) an approval workflow 166 associated with data modules 146 that include sensitive data. In this example, each selected smart contract 126 may select one or more approvers 130 based on rules 128 of the respective smart contract 126.

Each smart contract 126 may identify one or more approvers 130 associated with each of multiple data modules 146 of the production environment 145. For each selected data module 136, the rules 128 of the smart contract 126 are configured to select one or more approvers 130 that are authorized to review and approve access to the particular data module 146.

For a selected data module 146, the sandbox manager 150 may be configured to generate an approval workflow 166, which may essentially be a document and/or data file that includes all information needed by an approver to review, consider and approve/disapprove a request 108 from a user 106 for access to the data module. For example, the approval workflow 166, may include an identity of the user 106 that requested the sandbox 148, one or more data modules 146 requested for inclusion in the sandbox 148, and any other information that may be needed by the approver 130 to consider and make a decision regarding whether to approve the request.

Once an approver 130 is identified for a requested data module 146 based on a selected smart contract 126, the sandbox manager 150 may be configured to forward the approval workflow 166 generated for the data module 146 to the identified approver 130 (e.g., to a known network address of the approver 130 via email, or other messaging system). In one embodiment, the approval workflow 166 is transmitted to the identified approver 130 via the blockchain network 120 to avoid any tampering with the approval workflow. In one embodiment, each data module 146 is associated with a unique hashing algorithm 168. The sandbox manager 150 may be configured to select a hashing algorithm 168 associated with a requested data module 146 and run the hashing algorithm 168 over the approval workflow 166 generated for the data module 146 to generate a unique hash value 170. The sandbox manager 150 digitally signs the approval workflow 166 using the unique hash value 170 and transmits the digitally signed approval workflow 166 to the identified approver 130. Each approver 130 that is authorized to approve access to the data module 146 has access to the same unique hashing algorithm 168 associated with the data module 146. At the approver's end, the approver 130 receives the digitally signed approval workflow 166, extracts the approval workflow 166 and the hash value 170 included in transmission, and runs the same hashing algorithm 168 over the received approval workflow 166 to generate a second hash value 170. The approver 130 may determine that the received approval workflow 166 is identical to the one transmitted by the sandbox manager 150 when the hash value 170 received from the sandbox manager 150 matches with the hash value 170 generated by the approver 130. The above process for verifying the received approval workflow 166 avoids tampering of the approval workflow 166

Once the sandbox manager 150 receives an indication of approval from each approver 130 that was requested to approve access to the user for the selected data modules 146, the sandbox manager 150 may be configured to generate the sandbox 148 in the cloud infrastructure 140 by copying the requested data modules 146 from the production environment 145 to the sandbox 148 and may provide access of the generated sandbox 148 to the requesting user 106.

In one or more embodiments, the sandbox manager 150 may be configured to store each data interaction associated with generation of a requested sandbox 148 in the blockchain network 120. For example, the sandbox manager 150 may be configured to generate a new block 125 of the blockchain 124, wherein the new block 125 records the generation of a sandbox 148 (including the approval process described above). The new block 125 is added to the blockchain 124, thus permanently recording the approval process associated with generation of the sandbox 148.

Figure 2:
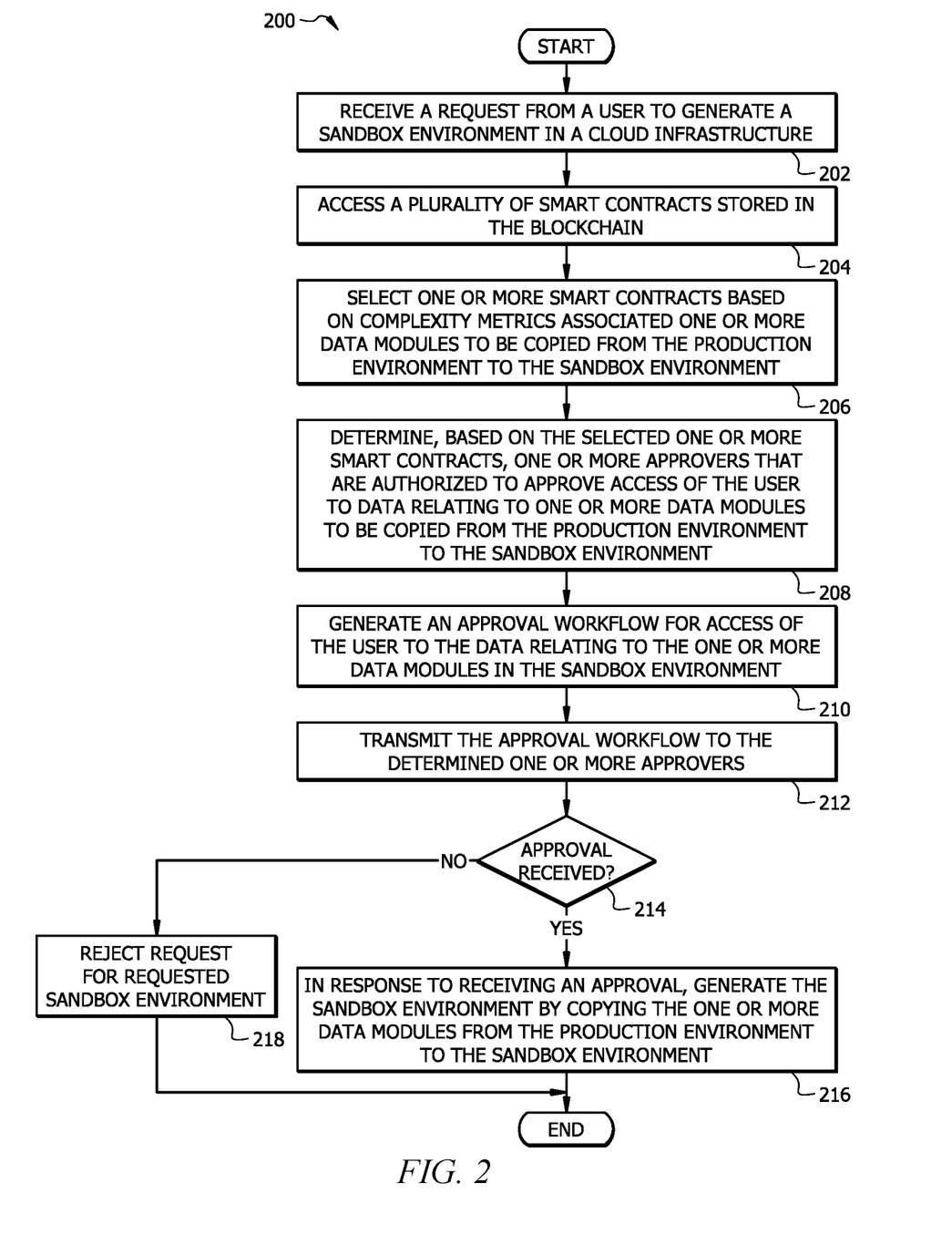
FIG. 2 illustrates a flowchart of an example method for an approval process associated with a sandbox, in accordance with one or more embodiments of the present disclosure.

FIG. 2 illustrates a flowchart of an example method 200 for an approval process associated with a sandbox 148, in accordance with one or more embodiments of the present disclosure. Method 200 may be performed by the sandbox manager 150 shown in FIG. 1.

At operation 202, the sandbox manager 150 receives a request 108 from a user 106 to generate a sandbox environment (e.g., a sandbox 148) in a cloud infrastructure 140. The requested sandbox 148 includes a copy of at least a portion of a production environment 145 and the request 108 includes a request for one or more data modules 146 to be copied from the production environment 145 to the sandbox 148.

As described above, the sandbox manager 150 may be configured to receive a request 108 from a user 106 to generate a sandbox 148 associated with the production environment 145 that is deployed in the cloud infrastructure 140. In one embodiment, the request 108 requests generation of the requested sandbox 148 in the cloud infrastructure 140, for example, using computing resources (e.g., cloud instances 144) provided by the cloud infrastructure 140. The request 108 may include a request for a full copy of the production environment 145 which includes copying the entire data associated with all data modules 146 of the production environment 145 into the requested sandbox 148. Alternatively, the request 108 may include a request for a partial copy of the production environment 145 which includes copying a portion of the production environment 145 (e.g., data associated with one or more data modules 146 but not all data modules 146) to the requested sandbox 148.

At operation 204, the sandbox manager 150 accesses a plurality of smart contracts 126 stored in a blockchain network 120, wherein each of the smart contracts 126 includes one or more rules 128 relating to selection of one or more approvers 130 that are authorized to approve access of the user 106 to data relating to one or more data modules 146 included in the production environment 145.

As described above, sandbox manager 150 may have access to a plurality of smart contracts 126 stored in the blockchain network 120 (e.g., stored in the blockchain ledger 122). Each smart contract 126 may include one or more rules 128 relating to selection of one or more approvers 130 that are authorized to approve access of the requesting user 106 to data relating to the one or more data modules 146 requested to be copied from the production environment 145 to the requested sandbox 148. A smart contract 126 may be configured to implement an approval workflow 166 based on a complexity metric 162 associated with a requested data module 146. For example, the one or more rules 128 associated with a smart contract 126 are configured to assign an approver 130 for review and approval of a requested data module 146 based on a complexity metric 162 associated with the requested data module 146. As described below, a complexity metric 162 associated with a data module 146 may be represented by one or more numerical weights 164 generated for the data module 146, wherein each numerical weight 164 is assigned based on a particular characteristic of the data module 146. In one embodiment, a particular smart contract 126 may be associated with a threshold value of a numerical weight 164 that is based on a particular characteristic of data modules 146, wherein the particular smart contract 126 may be selected to implement an approval workflow 166 for a data module 146 when the numerical weight 164 assigned to the data module 146 satisfies the threshold numerical weight associated with the smart contract 126.

Each smart contract 126 may identify of one or more approvers 130 that are authorized to review and approve access to a particular data module 146. In one embodiment, an approver 130 is a person that is authorized to review and approve access to a particular data module 146.

In certain embodiments, a particular smart contract may identify multiple approvers that can approve access to a same data module 146. In this case, the smart contract 126 may include rules 128 that select a particular approver 130 from the multiple approvers 130 based on a numerical weight 164 assigned to the data module 146. As described above, a numerical weight 164 may represent the amount of sensitive data contained in the data module 146, wherein a higher value of the numerical weight 164 represents a higher amount of sensitive data. The smart contract 126 may be configured to select a lower-level approver (e.g., a lower-level manager) for lower values of the numerical weight 164, and select a higher-level approver (e.g., an architect) for higher values of the numerical weight 164.

At operation 206, the sandbox manager 150 selects one or more smart contracts 126 from the plurality of smart contracts 126 based on complexity metrics 162 associated with the one or more data modules 146 to be copied from the production environment 145 to the requested sandbox 148.

At operation 208, the sandbox manager 150 determines, based on the selected one or more smart contracts 126, one or more approvers 130 that are authorized to approve access of the user 106 to the data relating to the one or more data modules 146 to be copied from the production environment 145 to the requested sandbox 148.

As described above, sandbox manager 150 may be configured to determine a complexity metric 162 for a data module 146 requested (e.g., via request 108) for copying to the sandbox 148. In one embodiment, the sandbox manager 150 may be configured to employ a generative artificial Intelligence (AI) algorithm to generate numerical weights 164 based on different characteristics relating to a data module 146, wherein each numerical weight 164 generated for a data module 146 represents at least a portion of the complexity metric 162 of the data module 146.

As described above, to implement an approval process associated with a requested sandbox 148, the sandbox manager 150 may be configured to select a smart contract 126 (from among a plurality of smart contracts 126) based on a complexity metric 162 (e.g., based on numerical weights 164 representing the complexity metric 162) associated with a data module 146 that was requested to be copied from the production environment 145 to the requested sandbox 148. For example, once one or more numerical weights 164 have been assigned to each data module 146 selected for inclusion in the requested sandbox 148, the sandbox manager 150 selects one or more smart contracts 126 based on the respective numerical weights 164 assigned to the data modules 146. For example, a smart contract 126 may be selected for each requested data module 146 as described above based on one or more numerical weights 164 assigned to the data module 146. In one embodiment, multiple smart contracts 126 may be selected for a single selected data module 146, wherein each smart contract 126 is selected based on a different type of numerical weight 164 assigned to the data module. For example, when a selected data module 146 includes inter-dependent modules and includes sensitive data, a first smart contract 126 may be selected that is configured to handle (e.g., implement) an approval workflow 166 associated with data modules 146 that are dependent on other data modules 146, and a second smart contract 126 may be selected that is configured to handle (e.g., implement) an approval workflow 166 associated with data modules 146 that include sensitive data. In this example, each selected smart contract 126 may select one or more approvers 130 based on rules 128 of the respective smart contract 126.

Each smart contract 126 may identify one or more approvers 130 associated with each of multiple data modules 146 of the production environment 145. For each selected data module 136, the rules 128 of the smart contract 126 are configured to select one or more approvers 130 that are authorized to review and approve access to the particular data module 146.

At operation 210, the sandbox manager 150 generates an approval workflow 166 for access of the user 106 to the data relating to the one or more data modules 146 in the sandbox 148.

As described above, for a selected data module 146, the sandbox manager 150 may be configured to generate an approval workflow 166, which may essentially be a document and/or data file that includes all information needed by an approver to review, consider and approve/disapprove a request 108 from a user 106 for generating a sandbox 148. For example, the approval workflow 166, may include an identity of the user 106 that requested the sandbox 148, one or more data modules 146 requested for inclusion in the sandbox 148, and any other information that may be needed by the approver 130 to consider and make a decision regarding whether to approve the request.

At operation 212, the sandbox manager 150 transmits the approval workflow 166 to the determined one or more approvers 130.

As described above, once an approver 130 is identified for a requested data module 146 based on a selected smart contract 126, the sandbox manager 150 may be configured to forward the approval workflow 166 generated for the data module 146 to the identified approver 130 (e.g., to a known network address of the approver 130 via email, or other messaging system). In one embodiment, the approval workflow 166 is transmitted to the identified approver 130 via the blockchain network 120 to avoid any tampering with the approval workflow. In one embodiment, each data module 146 is associated with a unique hashing algorithm 168. The sandbox manager 150 may be configured to select a hashing algorithm 168 associated with a requested data module 146 and run the hashing algorithm 168 over the approval workflow 166 generated for the data module 146 to generate a unique hash value 170. The sandbox manager 150 digitally signs the approval workflow 166 using the unique hash value 170 and transmits the digitally signed approval workflow 166 to the identified approver 130. Each approver 130 that is authorized to approve access to the data module 146 has access to the same unique hashing algorithm 168 associated with the data module 146. At the approver's end, the approver 130 receives the digitally signed approval workflow 166, extracts the approval workflow 166 and the hash value 170 included in transmission, and runs the same hashing algorithm 168 over the received approval workflow 166 to generate a second hash value 170. The approver 130 may determine that the received approval workflow 166 is identical to the one transmitted by the sandbox manager 150 when the hash value 170 received from the sandbox manager 150 matches with the hash value 170 generated by the approver 130. The above process for verifying the received approval workflow 166 avoids tampering of the approval workflow 166.

At operation 214, if the sandbox manager 150 receives an indication of approval from the one or more approvers, method 200 proceeds to operation 216.

At operation 216, the sandbox manager 150 in response to receiving the indication of approval, the sandbox manager 150 generates the sandbox 148 by copying the one or more data modules from the production environment 145 to the sandbox 148.

As described above, once the sandbox manager 150 receives an indication of approval from each approver 130 that was requested to approve access to the user for the selected data modules 146, the sandbox manager 150 may be configured to generate the sandbox 148 in the cloud infrastructure 140 by copying the requested data modules 146 from the production environment 145 to the sandbox 148 and may provide access of the generated sandbox 148 to the requesting user 106.

On the other hand, at operation 214, if an indication of approval is not received from the one or more approvers, the method 200 proceeds to operation 218 where the sandbox manager 150 rejects the request from the user 106 for generation of the sandbox 148.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
a production environment deployed using one or more cloud instances of a cloud infrastructure, wherein the cloud infrastructure comprises a plurality of computing nodes and wherein each cloud instance comprises at least a portion of computing resources provided by one or more of the computing nodes; and
a processor communicatively coupled to the cloud infrastructure and configured to:
receive a request to generate a sandbox environment in the cloud infrastructure, wherein:
the requested sandbox environment comprises a copy of at least a portion of the production environment; and
the request comprises a request for one or more data modules to be copied from the production environment to the sandbox environment;
access a plurality of smart contracts stored in a blockchain network, wherein each of the smart contracts comprises one or more rules relating to selection of one or more approvers that are authorized to approve access of a user to data relating to one or more data modules included in the production environment;
select one or more smart contracts from the plurality of smart contracts based on complexity metrics associated with the one or more data modules;
determine, based on the selected one or more smart contracts, one or more approvers that are authorized to approve access of the user to the data relating to the one or more data modules to be copied from the production environment to the sandbox environment;
generate an approval workflow for access of the user to the data relating to the one or more data modules in the sandbox environment;
transmit the approval workflow to the determined one or more approvers;
receive an indication of approval from the one or more approvers;
in response to receiving the indication of approval, generate the sandbox environment by copying the one or more data modules from the production environment to the sandbox environment.

2. The system of claim 1, wherein the processor is further configured to:
for each data module:
determine whether the data module comprises data designated as sensitive data that is accessible to authorized users only; and
assign a weight to the data module based on an amount of the sensitive data in the data module, wherein the weight assigned to the data module represents at least a portion of the complexity metric associated with the sandbox environment.

3. The system of claim 2, wherein:
a selected smart contract from the one or more smart contracts identifies a plurality of approvers for a data module of the requested one or more data modules, wherein each approver is associated with a particular value of the weight assigned to the data module; and
the processor is further configured to select an approver associated with the data module of the requested one or more data modules, wherein the selected approver is associated with the assigned weight of the data module.

4. The system of claim 2, wherein the sensitive data comprises one or more of Non-Public Information (NPI), Personal Identification Information (PII) or Production Information.

5. The system of claim 1, wherein the processor is further configured to:
for each data module:
determine whether the data module comprises dependencies to other data modules of the production environment; and
assign a weight to the data module based on an amount of dependencies to the other data modules, wherein the weight assigned to the data module represents at least a portion of the complexity metric associated with the sandbox environment.

6. The system of claim 5, wherein the processor is further configured to:
when the weight equals or exceeds a threshold, select a smart contract that includes one or more rules for selecting approvers associated with multiple dependent data modules.

7. The system of claim 1, wherein the processor is further configured to:
generate a new block of a blockchain associated with the blockchain network, wherein the new block records the generation of the sandbox environment; and
store the new block as part of the blockchain of the blockchain network.

8. A method for controlling access to data in a sandbox environment, comprising:
receiving a request from a user to generate the sandbox environment in a cloud infrastructure, wherein:
the requested sandbox environment comprises a copy of at least a portion of a production environment;
the production environment is deployed using one or more cloud instances of the cloud infrastructure, wherein the cloud infrastructure comprises a plurality of computing nodes and wherein each cloud instance comprises at least a portion of computing resources provided by one or more of the computing nodes; and
the request comprises a request for one or more data modules to be copied from the production environment to the sandbox environment;
accessing a plurality of smart contracts stored in a blockchain network, wherein each of the smart contracts comprises one or more rules relating to selection of one or more approvers that are authorized to approve access of the user to data relating to one or more data modules included in the production environment;
selecting one or more smart contracts from the plurality of smart contracts based on complexity metrics associated with the one or more data modules;
determining, based on the selected one or more smart contracts, one or more approvers that are authorized to approve access of the user to the data relating to the one or more data modules to be copied from the production environment to the sandbox environment;
generating an approval workflow for access of the user to the data relating to the one or more data modules in the sandbox environment;
transmitting the approval workflow to the determined one or more approvers;
receiving an indication of approval from the one or more approvers;
in response to receiving the indication of approval, generating the sandbox environment by copying the one or more data modules from the production environment to the sandbox environment.

9. The method of claim 8, further comprising:
for each data module:
determining whether the data module comprises data designated as sensitive data that is accessible to authorized users only; and
assigning a weight to the data module based on an amount of the sensitive data in the data module, wherein the weight assigned to the data module represents at least a portion of the complexity metric associated with the sandbox environment.

10. The method of claim 9, wherein:
a selected smart contract from the one or more smart contracts identifies a plurality of approvers for a data module of the requested one or more data modules, wherein each approver is associated with a particular value of the weight assigned to the data module; and
further comprising selecting an approver associated with the data module of the requested one or more data modules, wherein the selected approver is associated with the assigned weight of the data module.

11. The method of claim 9, wherein the sensitive data comprises one or more of Non-Public Information (NPI), Personal Identification Information (PII) or Production Information.

12. The method of claim 8, further comprising:
for each data module:
determining whether the data module comprises dependencies to other data modules of the production environment; and
assigning a weight to the data module based on an amount of dependencies to the other data modules, wherein the weight assigned to the data module represents at least a portion of the complexity metric associated with the sandbox environment.

13. The method of claim 12, further comprising:
when the weight equals or exceeds a threshold, selecting a smart contract that includes one or more rules for selecting approvers associated with multiple dependent data modules.

14. The method of claim 8, further comprising:
generating a new block of a blockchain associated with the blockchain network, wherein the new block records the generation of the sandbox environment; and
storing the new block as part of the blockchain of the blockchain network.

15. A non-transitory computer-readable medium storing instructions that when executed by a processor cause the processor to:
receive a request from a user to generate a sandbox environment in a cloud infrastructure, wherein:
the requested sandbox environment comprises a copy of at least a portion of a production environment;
the production environment is deployed using one or more cloud instances of the cloud infrastructure, wherein the cloud infrastructure comprises a plurality of computing nodes and wherein each cloud instance comprises at least a portion of computing resources provided by one or more of the computing nodes; and
the request comprises a request for one or more data modules to be copied from the production environment to the sandbox environment;
access a plurality of smart contracts stored in a blockchain network, wherein each of the smart contracts comprises one or more rules relating to selection of one or more approvers that are authorized to approve access of the user to data relating to one or more data modules included in the production environment;

select one or more smart contracts from the plurality of smart contracts based on complexity metrics associated with the one or more data modules;

determine, based on the selected one or more smart contracts, one or more approvers that are authorized to approve access of the user to the data relating to the one or more data modules to be copied from the production environment to the sandbox environment;

generate an approval workflow for access of the user to the data relating to the one or more data modules in the sandbox environment;

transmit the approval workflow to the determined one or more approvers;

receive an indication of approval from the one or more approvers;

in response to receiving the indication of approval, generate the sandbox environment by copying the one or more data modules from the production environment to the sandbox environment.

16. The non-transitory computer-readable medium of claim 15, wherein the instructions further cause the processor to:

for each data module:

determine whether the data module comprises data designated as sensitive data that is accessible to authorized users only; and assign a weight to the data module based on an amount of the sensitive data in the data module, wherein the weight assigned to the data module represents at least a portion of the complexity metric associated with the sandbox environment.

17. The non-transitory computer-readable medium of claim 16, wherein:

a selected smart contract from the one or more smart contracts identifies a plurality of approvers for a data module of the requested one or more data modules, wherein each approver is associated with a particular value of the weight assigned to the data module; and wherein the instructions further cause the processor to select an approver associated with the data module of the requested one or more data modules, wherein the selected approver is associated with the assigned weight of the data module.

18. The non-transitory computer-readable medium of claim 16, wherein the sensitive data comprises one or more of Non-Public Information (NPI), Personal Identification Information (PII) or Production Information.

19. The non-transitory computer-readable medium of claim 15, wherein the instructions further cause the processor to:

for each data module:

determine whether the data module comprises dependencies to other data modules of the production environment; and assign a weight to the data module based on an amount of dependencies to the other data modules, wherein the weight assigned to the data module represents at least a portion of the complexity metric associated with the sandbox environment.

20. The non-transitory computer-readable medium of claim 19, wherein the processor is further configured to:

when the weight equals or exceeds a threshold, select a smart contract that includes one or more rules for selecting approvers associated with multiple dependent data modules.

* * * * *